2,763,560
Patented Sept. 18, 1956

2,763,560

LEAD SILICOPHOSPHATE COMPOSITIONS AND PROCESSES FOR PREPARING THEM

Edward C. Broge, Cecil County, Md., assignor to E. I. du Pont de Nemours and Company, Wilmington, Del., a corporation of Delaware No Drawing. Application March 27, 1951,
Serial No. 217,889

7 Claims. (Cl. 106—53)

This invention relates to inorganic compositions consisting of lead, silicon, phosphorus and oxygen and to their preparation. More particularly, the invention is directed to crystalline lead silicophosphates and refractory compositions containing them.

The compositions of the invention can be represented by the empirical formula,

1. $(PbO)_{x+y}(SiO_2)_x(P_2O_5)_y$ where the ratio of $y$ to $x$ is from 0.35 to 0.70.

I have found that the compositions of Formula 1 can be prepared by several different methods. One of these methods involves intimately mixing vitreous lead metasilicate and vitreous lead metaphosphate in a proportion such that the ratio of $P_2O_5$ to $SiO_2$ is from 0.35 to 0.70, and then heating the resulting mixture to a temperature of from 500 to 1600° C.

A variation of this procedure is to cause crystalline lead metasilicate (melting point 766° C.) and crystalline lead metaphosphate (M. P. 710° C.) to react in the solid phase at a temperature somewhat below the melting point of either reactant, preferably at about 700° C.

The crystalline lead silicophosphates of the invention may also be prepared by the interaction of lead orthophosphate, $Pb_3(PO_4)_2$, and extremely finely divided silica at a temperature of from 1000 to 1300° C.

Another method of preparing the compositions of the invention involves the use of lead metasilicate and potassium metaphosphate. The by-product impurities, such as, for instance, potassium silicate, which are produced using these reactants may be removed by leaching with water.

Still other reactants may be employed which will provide the necessary components, which consist of PbO, $SiO_2$ and $P_2O_5$. In fact, these three components alone may be intimately mixed in such proportions that the ratio of $P_2O_5$ to $SiO_2$ is from 0.35 to 0.70 and the resulting mixture heated to a temperature of from 500° to 1600° C. to produce the compositions of the invention.

In summary, the compositions of Formula 1 can be prepared free of impurities by intimately mixing reactants selected from the groups consisting of lead metaphosphate and lead metasilicate; lead orthophosphate and amorphous silica; and lead oxide, silica and phosphorus pentoxide; in such proportions that the ratio of $y$ to $x$ is from 0.35 to 0.70, and heating the resulting mixture to a temperature of from 500° to 1600° C.

A particularly preferred method of preparing the compositions of my invention comprises heating a finely ground, intimate mixture of lead metaphosphate and lead metasilicate glasses in mole ratios of 1:2, 2:3 or 3:8 to a temperature of about 1000° C.

The lead metasilicate used in forming the compositions of the invention can be prepared by reacting lead oxide (PbO) and finely divided, amorphous silica at a temperature of about 900° C. for a period sufficient to effect reaction, say, for example, 3 to 4 hours.

Lead metaphosphate, the other preferred reactant, can be prepared by heating a mixture consisting of lead oxide and diammonium hydrogen phosphate to a temperature of about 800° C. This temperature is sufficient to decompose the ammonium phosphate with the evolution of ammonia and to cause the phosphoric acid, which is thereby liberated, to react with the lead oxide.

According to the invention, the reactants which I have described above, are subjected in the presence of air to a temperature of at leaest 500° C. It is preferred, particularly for increased reaction rate, to heat the reactants to temperatures from about 800° C. to about 1300° C. From a practical standpoint, temperatures above 1600° C. are usually not employed inasmuch as undesirable volatilization of the reactants becomes appreciable in this range.

It will be understood that the heating period depends upon a number of factors. These factors include particle size of the reactants, temperature to which the reactants are heated, uniformity of mixing and the size of the batch. Short heating periods such as, for instance, ten to thirty minutes may be employed. However, it may be necessary to regrind and refire the batch in order to promote complete reaction if the period of heating is no longer than 30 minutes. Somewhat longer heating periods, say, from 2 to 3 hours, are preferred.

Any of a variety of high temperature resistant crucibles or containers may be used in preparing the compositions of the invention. The preferred apparatus particularly from the standpoint of freedom from contamination is one of platinum. As a practical matter ceramic materials are usually avoided since they are frequently attached chemically by silicates and phosphates at high temperatures.

As will be noted from Formula 1 the compositions of the invention are chemical combinations of lead oxide, silicon dioxide, and phosporus pentoxide. The $$P_2O_5:SiO_2$$

ratios of the compositions can vary, as previously indicated, from 0.35 to 0.70. A preferred class of compositions are compounds in which the ratio of $P_2O_5:SiO_2$, or, in terms of Formula 1, the ratio of $y$ to $x$, is a fractional number selected from the group consisting of ⅔, ½ and ⅜.

The preferred compounds of my invention may be represented by the following empirical formulae:

2.                   $(PbO)_5(SiO_2)_3(P_2O_5)_2$

3.                   $(PbO)_3(SiO_2)_2(P_2O_5)$

4.                   $(PbO)_{11}(SiO_2)_8(P_2O_5)_3$

The compounds represented by Formulae 2, 3 and 4 are crystalline lead silicophosphates. They are characterized by having very strong X-ray diffraction patterns. The X-ray patterns obtained for these products did not correspond to those of any compound known in the art.

On this basis it is concluded that the compositions of Formulae 2, 3 and 4 are new chemical compounds.

It will be understood that all of the compositions of my invention are crystalline. Their X-ray powder patterns vary depending on the mole ratio of lead metaphosphate to lead metasilicate employed in the preparation of the compositions. For example, compositions of the invention in which the $P_2O_5:SiO_2$ ratio is intermediate between the ratios of the compounds represented by Formulae 2, 3 and 4 have X-ray patterns characteristic of mixtures of compounds of Formulae 2, 3 and 4.

The method used to obtain the X-ray diffraction powder patterns characterizing the compositions of the invention need not be described in any detail since the technique employed is already well understood by those skilled in the art. The method used is fully described in G. L. Clark's book, "Applied X-Rays," pages 199 et seq., McGraw-Hill Book Co., 1932.

The compositions of my invention are further characterized by having extremely high melting ranges. In many instances, the melting range of the composition is more than 500° C. higher than those of the reactants or starting materials. The compositions do not melt at temperatures below 1300° C. At 1600° C. sublimation is sometimes observed but no melting can be noticed.

The lead silicophosphates of the invention are refractory. Their refractory nature can be observed by placing a sample of the material in a small platinum crucible, heating it by means of an induction furnace, and observing the sample through a short focus telescope as the temperature is slowly raised.

The compositions of the invention are well adapted to use as ceramic coatings, ceramic bindings and in refractory compositions. For example, one can prepare a unique ceramic coating by starting with intimately mixed, low melting constituents, such as, for instance, lead metasilicate and lead metaphosphate. When this mixture is fired at reasonably low temperatures, say about 800° C., a product is formed which is impervious to temperatures of the order of from 1300 to 1400° C.

The compositions of my invention may be used to opacify lead glasses. The introduction of a small amount of potassium metaphosphate in a lead silicate glass leads to the separation of a high melting lead silicophosphate phase as finely divided particles. A cloudy or opaque appearance results.

The lead silicophosphates of the invention may also be used as white pigments.

Additionally, a highly refractory ceramic coating may be prepared using the compositions of the invention which by virtue of the high lead content insures high absorption for X-rays and other atomic radiations.

In order that the invention may be better understood, reference should be had to the following illustrative examples:

Example 1

This example illustrates the preparation of a compound having the empirical formula $(PbO)_5(SiO_2)_3(P_2O_5)_2$ by the interaction of lead metaphosphate and lead metasilicate glass in a 2:3 mole ratio at an elevated temperature.

A mixture consisting of 25 parts of finely divided amorphous silica, which analyzed 99.9% silica, and 89.2 parts of lead oxide was heated to a temperature of 800–900° C. The reaction mixture was maintained in this temperature range for a period of about 4 hours and then cooled rapidly to normal room temperature. The lead metasilicate so produced was in the form of a clear, brittle glass.

The other reactant, lead metaphosphate, was prepared by heating a mixture consisting of 44.6 parts of lead oxide and 52.8 parts of diammonium hydrogen phosphate in a finely divided state to a temperature of from 800 to 900° C. The product thus obtained was cooled rapidly to room temperature to form a clear glass.

A mixture consisting of 73 parts of lead metaphosphate glass and 85 parts of lead metasilicate were ground exhaustively in an agate mortar, transferred to a platinum dish and heated in a muffle type furnace to a temperature of about 1100° C. The mixture was maintained at this temperature for a period of about 2 hours. The solid mass thus obtained was cooled to normal room temperature, exhaustively reground in an agate mortar, and refired at 1100° C. for an additional period of 2 hours.

The resulting product had a crystalline structure and is characterized by the following X-ray diffraction pattern:

| Interplaner Spacing, A. Units | Relative Intensity[1] | Interplaner Spacing, A. Units | Relative Intensity[1] |
|---|---|---|---|
| 4.6 | fff | 1.90 | f |
| 4.35 | ff | 1.88 | ms |
| 4.18 | ff | 1.85 | fm |
| 4.00 | m | 1.82 | m |
| 3.88 | m | 1.78 | fm |
| 3.78 | ff | 1.76 | fm |
| 3.72 | ff | 1.71 | f |
| 3.51 | fm | 1.70 | f |
| 3.41 | f | 1.67 | m |
| 3.33 | s | 1.65 | f |
| 3.27 | s | 1.63 | fm |
| 3.21 | s | 1.61 | f |
| 3.15 | s | 1.58 | fm |
| 3.08 | ms | 1.57 | f |
| 3.05 | ms | 1.56 | ff |
| 3.00 | m | 1.55 | fff |
| 2.97 | m | 1.54 | fff |
| 2.77 | m | 1.515 | m |
| 2.73 | m | 1.485 | ms |
| 2.70 | f | 1.46 | f |
| 2.67 | f | 1.445 | f |
| 2.53 | ff | 1.428 | fm |
| 2.50 | ff | 1.412 | fm |
| 2.42 | ff | 1.390 | f |
| 2.32 | ff | 1.375 | m |
| 2.27 | ff | 1.360 | f |
| 2.20 | s | 1.350 | f |
| 2.18 | f | 1.336 | m |
| 2.17 | m | 1.315 | f |
| 2.13 | m | 1.296 | f |
| 2.08 | s | 1.278 | f |
| 2.04 | s | 1.261 | f |
| 2.02 | f | 1.248 | m |
| 2.00 | ff | 1.216 | m |
| 1.98 | s | 1.200 | ff |
| 1.95 | f | 1.076 | m |
| 1.92 | ms | | |

[1] f = faint; ff = very faint; fff = very very faint; m = medium; s = strong.

The melting characteristic of the product was observed by placing a small quantity of it in a platinum dish and inserting the dish in a muffle furnace. As the temperature of the furnace was gradually raised to 1300° C., the sample was observed through a small opening in the furnace with a short focus telescope. No melting could be observed at 1300° C., the upper temperature limit of operation of the muffle furnace. A small portion of the sample was then placed on a platinum support which in turn was supported by a block of magnesia in a graphite crucible. This assembly was placed in an induction furnace and the temperature gradually raised above 1300° C. At 1500° C. no melting had yet occurred, although the presence of fumes indicated that sublimation was in progress. At about 1700° C. the platinum support melted but the product was still solid.

Example 2

This example illustrates the preparation of a compound having the following empirical formula:

$$(PbO)_3(SiO_2)_2(P_2O_5)$$

A crystalline lead silicophosphate having the above empirical formula was prepared as in Example 1 with the exception that the mole ratio of lead metaphosphate to lead metasilicate was changed from 2:3 to 1:2.

28.3 parts of lead metasilicate glass and 18.3 parts of lead metaphosphate glass were finely pulverized and intimately mixed in an agate mortar. This mixture was then placed in a platinum dish and fired for a period of 2 hours at a temperature of 1000° C. The solid mass was cooled and again reground in the agate mortar. It was refired at 1000° C. for an additional 2 hours. Upon removal of the solid product and exposure to X-rays it was found to be completely crystallized. Its characteristic X-ray pattern is as follows:

| Interplaner Spacings, A. Units | Relative Intensity [1] | Interplaner Spacings, A. Units | Relative Intensity [1] | Interplaner Spacings, A. Units | Relative Intensity [1] |
|---|---|---|---|---|---|
| 4.70 | m | 2.12 | fm | 1.445 | f |
| 4.56 | m | 2.07 | ms | 1.425 | f |
| 4.47 | fff | 2.04 | ms | 1.412 | f |
| 4.36 | ff | 2.01 | fff | 1.396 | f |
| 4.24 | ff | 1.99 | fff | 1.384 | ms |
| 4.00 | m | 1.91 | fm | 1.372 | ms |
| 3.58 | f | 1.89 | fm | 1.362 | f |
| 3.48 | ms | 1.858 | ss | 1.345 | s |
| 3.30 | ff | 1.82 | f | 1.31 | m |
| 3.20 | ff | 1.80 | fff | 1.290 | f |
| 3.12 | ss | 1.775 | fm | 1.277 | f |
| 3.04 | s | 1.755 | fm | 1.262 | f |
| 2.83 | m | 1.74 | s | 1.248 | f |
| 2.74 | s | 1.725 | ms | 1.235 | ms |
| 2.70 | f | 1.69 | f | 1.214 | ms |
| 2.57 | ff | 1.68 | f | 1.203 | fm |
| 2.47 | f | 1.675 | f | 1.173 | m |
| 2.41 | f | 1.66 | m | 1.164 | m |
| 2.36 | f | 1.625 | m | 1.148 | ff |
| 2.33 | ff | 1.58 | f | 1.132 | f |
| 2.30 | ff | 1.565 | fm | 1.122 | f |
| 2.24 | ms | 1.555 | fm | 1.114 | f |
| 2.19 | m | 1.52 | fm | 1.100 | f |
| 2.17 | fm | 1.49 | fff | 1.091 | m |
| 2.14 | ff | 1.472 | fm | | |

[1] f=faint; ff=very faint; fff=very very faint; m=medium, s=strong; ss=very strong.

An observation of the thermal stability of this product revealed that it did not melt at temperatures of the order of 1300° C.

Example 3

This example illustrates the preparation of the compound having the following empirical formula:

$$(PbO)_{11}(SiO_2)_8(P_2O_5)_3$$

A crystalline lead silicophosphate having the above formula was prepared exactly as in Example 1 with the exception that the mole ratio of lead metaphosphate to lead metasilicate was 3:8.

37 parts of lead metaphosphate and 76 parts of lead metasilicate glass were intimately mixed and ground in an agate mortar and then fired for a period of 1½ hours at a temperature of 1100° C. At the end of this period the solid mass was removed from the furnace, cooled, reground in the agate mortar and subsequently refired for an additional 3 hours at a temperature of 1050° C. Upon cooling, the white crystalline mass was found to have the following characteristic X-ray pattern:

| Interplaner Spacings, A. Units | Relative Intensity [1] | Interplaner Spacings, A. Units | Relative Intensity [1] | Interplaner Spacings, A. Units | Relative Intensity [1] |
|---|---|---|---|---|---|
| 4.85 | f | 2.04 | ss | 1.370 | f |
| 4.23 | ms | 1.98 | s | 1.360 | fm |
| 4.05 | ms | 1.95 | ss | 1.338 | s |
| 3.90 | fff | 1.91 | fff | 1.32 | ms |
| 3.80 | fff | 1.88 | s | 1.305 | s |
| 3.68 | ff | 1.85 | s | 1.293 | m |
| 3.46 | fff | 1.83 | sss | 1.272 | s |
| 3.38 | ms | 1.795 | fff | 1.224 | m |
| 3.20 | ms | 1.73 | ff | 1.208 | m |
| 3.12 | f | 1.72 | fm | 1.190 | m |
| 3.05 | f | 1.69 | m | 1.175 | m |
| 3.00 | fff | 1.655 | m | 1.162 | ff |
| 2.94 | sss | 1.63 | ff | 1.153 | fm |
| 2.82 | ms | 1.595 | ss | 1.145 | f |
| 2.75 | f | 1.56 | fff | 1.123 | fm |
| 2.56 | fff | 1.540 | ss | 1.111 | ff |
| 2.45 | fff | 1.522 | s | 1.099 | fm |
| 2.32 | fff | 1.50 | fff | 1.089 | fm |
| 2.24 | m | 1.49 | ss | 1.074 | f |
| 2.19 | ms | 1.47 | f | 1.060 | ms |
| 2.15 | fff | 1.445 | fff | 1.040 | fm |
| 2.12 | m | 1.415 | fm | 1.027 | m |
| 2.06 | fff | 1.390 | fm | 1.018 | ms |

[1] f=faint; ff=very faint; fff=very, very faint; m=medium; s=strong; ss=very strong; sss=very, very strong.

The crystalline composition was found to be highly refractory and could not be melted at temperatures of the order of 1400° C.

Example 4

The preparation of a composition of my invention from crystalline lead orthophosphate and amorphous silica is here illustrated.

A mixture consisting of 265.3 parts of lead metaphosphate glass and 446.4 parts of lead oxide was melted at a temperature of 1020° C. The mixture was maintained above this temperature but below 1100° C. for a period of 5 hours. Upon cooling the melt, white crystals were formed. These crystals were identified as lead orthophosphate by a characteristic X-ray powder pattern which compared with that recorded for lead orthophosphate in the card files of the American Society for Testing Materials.

Using apparatus similar to that employed in Example 1, a mixture consisting of 120.2 parts of finely divided amorphous silica, which analyzed to 99.9% $SiO_2$ and which is known in the trade as "Linde Fine Silica," and 812 parts of crystalline lead orthophosphate prepared in the above manner was subjected to a temperature of about 1100° C. for a period of 3 hours. A compound having the empirical formula $(PbO)_3(SiO_2)_2(P_2O_5)$ was produced.

Upon examination of this solid material by X-rays, a characteristic powder pattern identical with that found for the composition of Example 2 was obtained. It is, therefore, concluded that the composition of Formula 3 may be prepared either by reaction of the metaphosphate and metasilicate glasses or, alternatively, by the reaction of amorphous silica with lead orthophosphate.

I claim:

1. In a process of preparing a composition of the formula $(PbO)_{x+y}(SiO_2)_x(P_2O_5)_y$ where the ratio of $y$ to $x$ is from 0.35 to 0.70, the steps consisting essentially of intimately mixing lead metaphosphate and lead metasilicate in such proportion that the ratio of $y$ to $x$ in the resulting mixture is at least 0.35 but not exceeding 0.70, and heating the resulting mixture to a temperature of from 500° C. to 1600° C.

2. A process for the preparation of a crystalline lead silicophosphate consisting essentially of the steps of intimately mixing lead metaphosphate and lead metasilicate in such proportion that the ratio of $P_2O_5$ to $SiO_2$ in the resulting mixture is at least 0.35 but not exceeding 0.7, and subsequently heating the mixture to a temperature of from 800° C. to 1300° C. until the desired crystalline lead silicophosphate is formed.

3. In a process of preparing a composition of the formula $(PbO)_{x+y}(SiO_2)_x(P_2O_5)_y$ where the ratio of $y$ to $x$ is from 0.35 to 0.70, the steps consisting essentially of intimately mixing lead orthophosphate and amorphous silica in such proportion that the ratio of $y$ to $x$ is at least 0.35 but not exceeding 0.70 and then heating the mixture to a temperature of from 1000° C. to 1300° C. until a composition containing a crystalline lead silicophosphate is formed.

4. A crystalline lead silicophosphate represented by the empirical formula $(PbO)_{x+y}(SiO_2)_x(P_2O_5)_y$ where the ratio of $y$ to $x$ is ⅔.

5. Crystalline lead silicophosphate represented by the empirical formula $(PbO)_{x+y}(SiO_2)_x(P_2O_5)_y$ where the ratio of $y$ to $x$ is ½.

6. Crystalline lead silicophosphate represented by the empirical formula $(PbO)_{x+y}(SiO_2)_x(P_2O_5)_y$ where the ratio of $y$ to $x$ is ⅜.

7. In a process of preparing a composition of the formula $(PbO)_{x+y}(SiO_2)_x(P_2O_5)_y$ where the ratio of $y$ to $x$ is from 0.35 to 0.70, the steps consisting essentially of intimately mixing lead oxide, silica and phosphorus pentoxide in such proportion that the ratio of $y$ to $x$ is at least 0.35 but not exceeding 0.70 and then heating the mixture to a temperature of from 1000° C. to 1300° C. until a composition containing a crystalline lead silicophosphate is formed.

(References on following page)

References Cited in the file of this patent
UNITED STATES PATENTS

| | | |
|---|---|---|
| 2,100,391 | Grimm | Nov. 30, 1937 |
| 2,426,395 | Harvey | Aug. 26, 1947 |
| 2,479,504 | Moore | Aug. 16, 1949 |
| 2,532,386 | Armistead | Dec. 5, 1950 |

OTHER REFERENCES

Gmelin - Kraut: "Handbuch der Anorganischen Chemie," published by Carl Winters, Universitatbuchhandling, Heidelberg, 1924; Band IV, Abteilung 2, page 615.